United States Patent [19]

Gotou

[11] Patent Number: 4,494,053
[45] Date of Patent: Jan. 15, 1985

[54] WINDING VOLTAGE BALANCING CIRCUIT FOR BRUSHLESS DC MOTOR

[75] Inventor: Makoto Gotou, Nishinomiya, Japan

[73] Assignee: Matsushita Electric Industrial Co., Ltd., Kadoma, Japan

[21] Appl. No.: 445,174

[22] Filed: Nov. 29, 1982

[30] Foreign Application Priority Data

| Nov. 27, 1981 | [JP] | Japan | 56-191392 |
| Nov. 27, 1981 | [JP] | Japan | 56-191393 |
| Nov. 28, 1981 | [JP] | Japan | 56-191582 |
| Nov. 28, 1981 | [JP] | Japan | 56-191583 |

[51] Int. Cl.³ .......................................... H02K 29/00
[52] U.S. Cl. ..................... 318/254; 318/138; 318/439
[58] Field of Search ............... 318/138, 254 A, 254, 318/439

[56] References Cited

U.S. PATENT DOCUMENTS

| 3,783,359 | 1/1974 | Malkiel . | |
| 4,035,700 | 7/1977 | Kawasaki et al. | 318/138 |
| 4,047,081 | 9/1977 | Liska . | |
| 4,278,921 | 7/1981 | Medding et al. | 318/439 X |
| 4,292,575 | 9/1981 | Kühnlein et al. | 318/439 X |
| 4,376,261 | 3/1983 | Heide et al. | 318/254 |
| 4,403,174 | 9/1983 | Miyazaki et al. | 318/254 |

FOREIGN PATENT DOCUMENTS

| 2263598 | 8/1974 | Fed. Rep. of Germany . |
| 2508546 | 3/1978 | Fed. Rep. of Germany . |
| 58-33986 | 2/1983 | Japan | 318/254 |
| 58-33987 | 2/1983 | Japan | 318/254 |
| 58-33988 | 2/1983 | Japan | 318/254 |

*Primary Examiner*—Stanley J. Witkowski
*Assistant Examiner*—Bentsu Ro
*Attorney, Agent, or Firm*—Wenderoth, Lind & Ponack

[57] ABSTRACT

In a brushless DC motor having a magnet and multiphase coils, a current is distributed from a DC voltage source to the multiphase coils according to a set of output signals of a position detector for detecting the relative position between the magnet and the multiphase coils. First and second sets of output transistors are used so as to distribute a current to the corresponding multiphase coils. A first distributor selectively activates the first output transistors corresponding to the output signals of the position detector so as to supply the multiphase coils with a current according to a command signal, and a second distributor also selectively activates the second output transistors corresponding to the output signals of the position detector. A second distributor has a voltage drop controller for detecting voltage drops across the first set of output transistors (or the second set of output transistors) in each activated period and for controlling output currents of the second set of output transistors so as to maintain the voltage drops across the first set of output transistors (or the second set of output transistors) in each activated period at a predetermined value regardless of the relative position between the magnet and the multiphase coils.

12 Claims, 12 Drawing Figures

WINDING VOLTAGE BALANCING CIRCUIT FOR BRUSHLESS DC MOTOR

BACKGROUND OF THE INVENTION

1. Field of the Invention

This invention relates to a brushless DC motor having a magnet (field flux generating means) and multiphase coils, and more particularly to a brushless DC motor in which a current is distributed from a DC voltage source to said multiphase coils by selectively activating two sets of output transistors, according to the relative position between said magnet and said multiphase coils.

2. Description of the Prior Art

According to the prior art, in a brushless DC motor Y-connected multiphase coils are supplied with bidirectional currents by full-wave signals. The terminal of each coil of the multiphase coils opposite to the common terminal of the Y connection is each connected to one current supplying means through one set of output transistors (first output transistors) and also each connected to the other current supplying means through the other set of output transistors (second output transistors). By designing the two sets of output transistors to operate differentially, the two sets of output transistors can selectively cause a current to flow through the common terminal of the Y connection time sequentially.

Such a brushless DC motor is theoretically capable of keeping the selectively-and-sequentially-flowing current constant, avoiding the current flow through unselected coils and switching the current flow through the coils precisely. However, this theoretical operation occasionally cannot be achieved in practice due to the difference between the current commanded by one current supplying means and the current commanded by the other current supplying means. Thus, the characteristics of the motor operation are deteriorated by the undesired flow of currents to the multiphase coils.

The U.S. Pat. No. 4,035,700 discloses an electronic control apparatus for a brushless DC motor, which overcomes the defects described hereinbefore by detecting a voltage at the common terminal of the Y-connected multiphase coils and controlling a current supplied to the multiphase coils through one set of output transistors so that the voltage at the common terminal is equal to a reference voltage. Though this apparatus described in U.S. Pat. No. 4,035,700 has many excellent characteristics for a brushless DC motor, it is necessary for the common terminal of the Y-connected multiphase coils to be picked up from the motor structure and to be connected to an electronic control circuit only for detecting the voltage at the common terminal. This increases connecting lines between the motor structure and the control circuit, which is disadvantageous for mass production.

Furthermore, it can be used only for a brushless DC motor having Y-connected multiphase coils, in other words, it cannot be used for a brushless DC motor having delta-connected multiphase coils.

SUMMARY OF THE INVENTION

It is an object of this invention to provide a brushless DC motor having field flux generating means and multiphase coils regardless of the connection, which overcomes the defects described hereinbefore.

It is another object of this invention to provide a brushless DC motor having field flux generating means and star-connected multiphase coils, in which a current supplied to the multiphase coils can be switched precisely according to the relative position between the field flux generating means and the multiphase coils and the current flow through unselected coils can be avoided without detecting the voltage at the common terminal of the Y-connected multiphase coils.

It is a further object of this invention to provide a brushless DC motor having field flux generating means and delta-connected multiphase coils, in which a current supplied to the multiphase coils can be switched precisely according to the relative position between the field flux generating means and the multiphase coils and the current flow through unselected coils can be avoided without any additional connecting lines between the motor structure and the control circuit.

These objects can be achieved according to this invention by a brushless DC motor comprising: a field flux generating means having a plurality of N and S poles; multiphase coils for generating a force by the interaction between a current flowing through said multiphase coils and fluxes of said field flux generating means; a DC voltage source for supplying a current to said multiphase coils; a plurality of first output transistors; a plurality of second output transistors, each of the current-input terminals of said multiphase coils being connected to a corresponding one of said plurality of first output transistors and to a corresponding one of said plurality of second output transistors so as to supply said multiphase coils with a current by activating at least one of said first output transistors and at least one of said second output transistors at the same time; a position detecting means for providing a set of output signals corresponding to the relative position between said field flux generating means and said multiphase coils; a first distributing means for selectively activating said plurality of first output transistors corresponding to the output signals from said position detecting means so as to supply said multiphase coils with a current according to a command signal; a second distributing means for selectively activating said plurality of second output transistors corresponding to the output signals from said position detecting means, wherein said second distributing means has a voltage drop controlling means for detecting voltage drops across said first output transistors in each activated period and for controlling output currents of said second output transistors so as to maintain the voltage drops across said first output transistors in each activated period at a predetermined value.

The above objects can also be achieved according to this invention by a brushless DC motor comprising: a field flux generating means having a plurality of N and S poles; multiphase coils for generating a force by the interaction between a current flowing through said multiphase coils and fluxes of said field flux generating means; a DC voltage source for supplying a current to said multiphase coils; a plurality of first output transistors; a plurality of second output transistors, each of the current-input terminals of said multiphase coils being connected to a corresponding one of said plurality of first output transistors and to a corresponding one of said plurality of second output transistors so as to supply said multiphase coils with a current by activating at least one of said first output transistors and at least one of said second output transistors at the same time; a position detecting means for providing a set of output signals corresponding to the relative position between said field flux generating means and said multiphase coils; a first distributing means for selectively activating said plurality of first output transistors corresponding to the output signals from said position detecting means so as to supply said multiphase coils with a current according to a command signal; a second distributing means for selectively activating said plurality of second output transistors corresponding to the output signals from said position detecting means, wherein said second distributing means has a voltage drop controlling means for detecting voltage drops across said second output transistors in each activated period and for controlling output currents of said second output transistors so as to maintain the voltage drops across said second output transistors in each activated period at a predetermined value.

The above and other objects and features of the invention will be apparent from consideration of the detailed description of the invention together with the accompanying drawings, in which:

DESCRIPTION OF THE PREFERRED EMBODIMENTS

Figure 1:
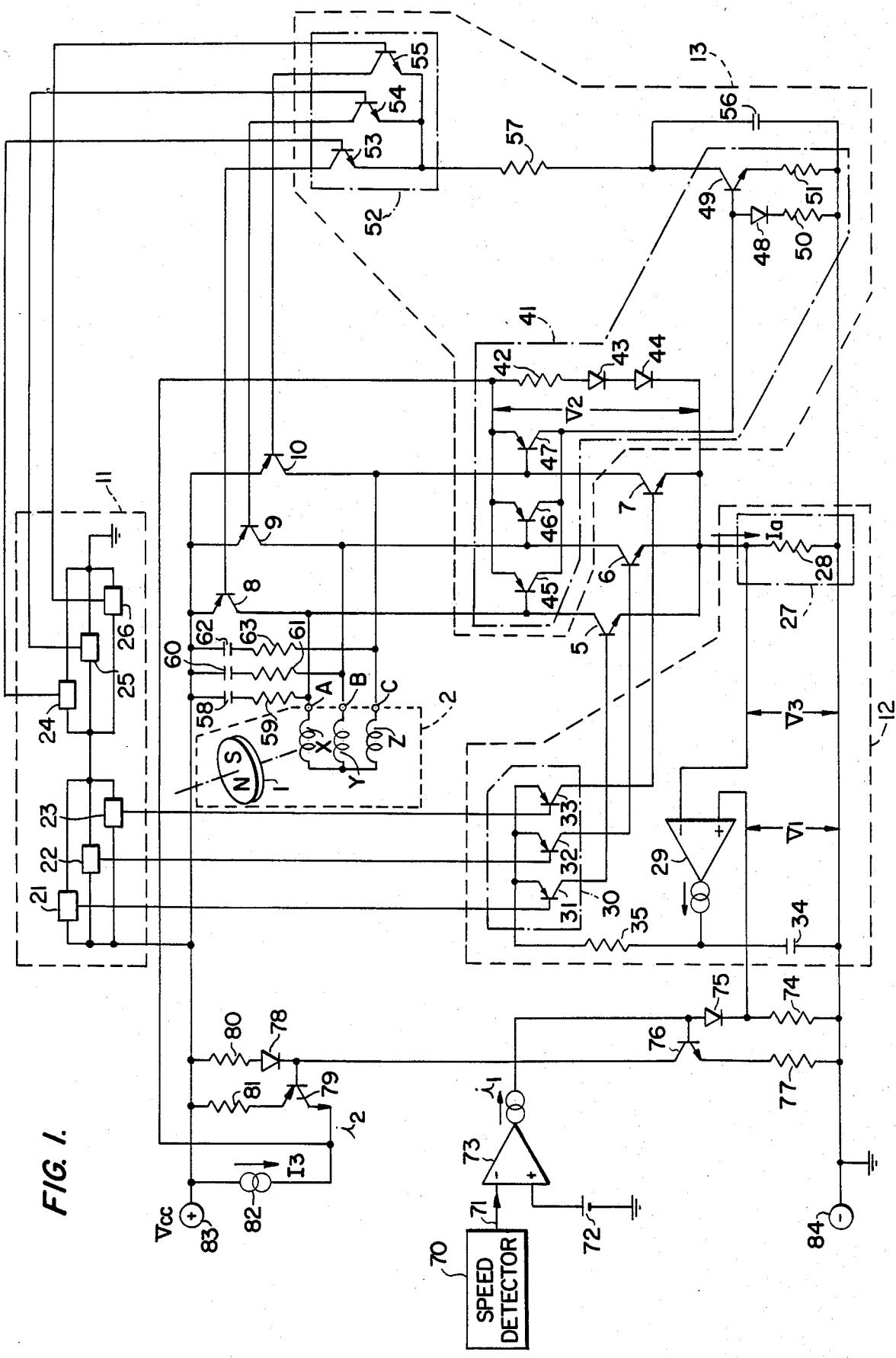
FIG. 1 is a circuit diagram of an embodiment of a brushless DC motor according to the present invention.

Referring to FIG. 1, which is a circuit diagram of an embodiment of a brushless DC motor according to the invention, a magnet 1 (field flux generating means) is a multipole permanent magnet having a plurality of N and S poles for generating a field flux around it. Three phase coils X, Y and Z, connected in the manner of a Y-connection, interlink the flux of the magnet 1 so that a current flowing through each coil X, Y or Z generates a drive force by its interaction with the flux of the magnet 1. The magnet 1 and the three phase coils X, Y and Z are essential components of a motor structure 2 enclosed by a broken line. A position detector 11 has a plurality of Hall elements 21, 22, 23, 24, 25 and 26 for detecting the flux of the magnet 1, and produces two sets of three phase voltage signals corresponding to the relative position between the magnet 1 and the three phase coils X, Y and Z. (The output voltages of the Hall elements 21, 22 and 23 are similar to those of the Hall elements 24, 25 and 26, respectively.) First output transistors 5, 6 and 7 and second output transistors 8, 9 and 10 are provided so as to supply full-wave currents (bidirectional currents) to the three phase coils X, Y and Z from a DC voltage source $V_{cc}$ applied between terminals 83 and 84. Each of the first output transistors 5, 6 and 7 and the second output transistors 8, 9 and 10 has terminals of output, input and control, in this case, the output, input and control terminals are the collector, emitter and base terminals, respectively.

Each of current-input terminals A, B and C of the three phase coils X, Y and Z is connected to a corresponding one of the output terminals of the first output transistors 5, 6 and 7, and is also connected to a corresponding one of the output terminals of the second output transistors 8, 9 and 10. The input terminals of the first output transistors 5, 6 and 7 are connected to one terminal (negative terminal 84) of the DC voltage source $V_{cc}$ through a resistor 28, and the input terminals of the second output transistors 8, 9 and 10 are connected to the other terminal (positive terminal 83) of the DC voltage source $V_{cc}$. The control terminals of the first output transistors 5, 6 and 7 are connected to outputs of a first distributor 12 enclosed by a broken line, which selectively activates the first output transistors 5, 6 and 7 corresponding to the output signals of the position detector 11. The control terminals of the second output transistors 8, 9 and 10 are connected to outputs of a second distributor 13, which selectively activates the second output transistors 8, 9 and 10 corresponding to the output signals of the position detector 11.

Figure 2:
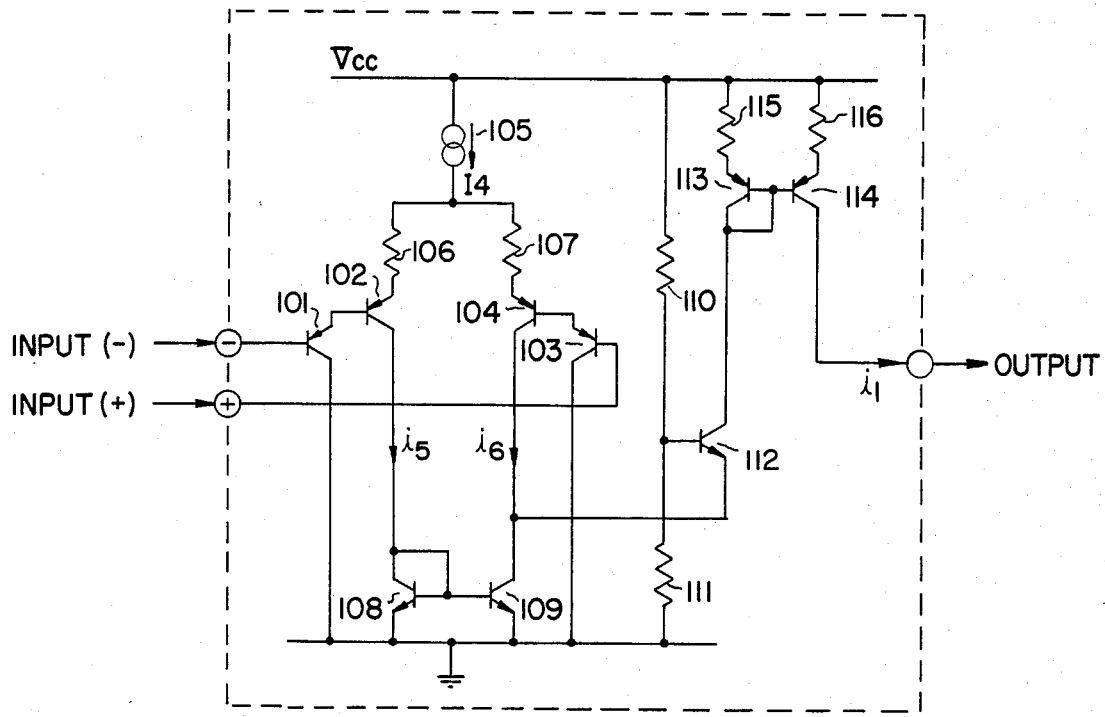
FIG. 2 is a circuit diagram of a voltage-to-current converter or a current controller shown in FIG. 1.

Next, the operation of the embodiment will be described hereinafter. The DC voltage source $V_{cc}$ ($V_{cc}=20$ V) is applied between the terminals 83 and 84. A well known speed detector 70 produces a voltage signal 71 corresponding to the rotational speed of the magnet 1. A voltage-to-current converter 73 compares the voltage signal 71 with the voltage which is output from a voltage source 72, and a current $i_1$ corresponding to the input voltage difference flows out to a resistor 74 so as to produce a command signal $V_1$. An embodiment of the voltage-to-current converter 73 is shown in FIG. 2. The collector currents $i_5$ and $i_6$ of differential transistors 102 and 104 are respectively directly proportional and inversely proportional to the input voltage difference. Transistors 108 and 109 form a current mirror circuit (active loads to the differential transistors 102 and 104), so the difference current ($i_5-i_6$) is derived from a transistor 112 when ($i_5-i_6$)$\geq 0$. Since transistors 113, 114 and resistors 115, 116 form a current mirror circuit, the output current $i_1$ is proportional to the current ($i_5-i_6$) corresponding to the input voltage difference of the voltage-to-current converter 73 when ($i_5-i_6$)$\geq 0$, and $i_1$ is zero when ($i_5-i_6$)$>0$ (which is the case when the rotational speed of the magnet 1 is faster than the desired speed).

Since, as shown in FIG. 1 a diode 75, a transistor 76 and resistors 74, 77 form a current mirror circuit and a diode 78, a transistor 79 and resistors 80, 81 form another current mirror circuit, the collector current $i_2$ of the transistor 79 is proportional to the output current $i_1$ of the voltage-to-current converter 73. A current $I_3$ of a constant current source 82 and the collector current $i_2$ of the transistor 79 are combined, and the combined current ($I_3+i_2$) is supplied to a resistor 42 and diodes 43, 44 in a second distributor 13 so as to produce a reference voltage.

The first distributor 12 has a current detector 27 comprising: the resistor 28 for detecting a total current $I_a$ flowing through the three phase coils X, Y and Z from the DC voltage source $V_{cc}$; a current controller 29 for providing an output current corresponding to the difference between the command signal $V_1$ and the output signal $V_3$ of the current detector 27; and a selector 30 (first selector) for selecting a current path from the current controller 29 to the first output transistors according to the output signals of the position detector 11.

An embodiment of the current controller 29 is the same as that of the voltage-to-current converter 73 shown in FIG. 2. Therefore, the output current of the current controller 29 corresponds to the difference between the command signal $V_1$ and the detected signal $V_3$, and the system operates so that the detected signal $V_3$ will be equal to the command signal $V_1$ by increasing or decreasing the total supply current $I_a$ flowing through the three phase coils X, Y and Z according to the increase or decrease of the command signal $V_1$. This operation of the system is described below.

According to the increase of the command signal $V_1$, the output current of the current controller 29 becomes larger, and this causes the increase of the input current to the first selector 30. The first selector 30 comprises transistors 31, 32 and 33 which operate differentially since their emitters are connected together (either directly or through a resistor or a diode). The output voltages of the Hall elements 21, 22 and 23 in the position detector 11 are respectively supplied to bases of the transistors 31, 32 and 33 in the first selector 30. The common emitter current, which is the output current of the current controller 29, is fed to the collectors of the transistors 31, 32 and 33 according to the voltage differences among the output voltages of the Hall elements 21, 22 and 23.

As the result of this, the collector current of the transistor having the smallest base voltage is the largest, and collector currents of the other transistors are relatively much smaller (almost zero). The activated transistor in the first selector 30 changes smoothly according to the rotation of the magnet 1, because the output voltages of the Hall elements 21, 22 and 23 change smoothly in the fashion of three phase sine waveforms.

Since the collector current of the transistors 31, 32 and 33 in the first selector 30 becomes the base current of the respective first output transistors 5, 6 and 7, the current amplified by each first output transistor 5, 6 or 7 is supplied to each of the three phase coils X, Y and Z. The current detector 27 detects the total current $I_a$ flowing through the three phase coils X, Y and Z, and provides the detected signal $V_3$ which is supplied to the inverting input terminal of the current controller 29.

Therefore, the current detector 27, the current controller 29, the first selector 30 and the first output transistors 5, 6 and 7 form a feedback loop (first feedback loop), which controls the current $I_a$ to the three phase coils X, Y and Z according to the command signal $V_1$ so that it is constant irrespective of an unbalance and a variation of the $h_{FE}$ values of the first output transistors 5, 6 and 7.

As a result of this, the following equation is valid.

$$V_3 = V_1 \tag{1}$$

that is, $$I_a = (V_1/R_{28}) = (R_{74}/R_{28}) \cdot i_1 \tag{2}$$

, where $R_{28}$ and $R_{74}$ are the respective resistance values of the resistors 28 and 74.

From the equation (2) and the foregoing explanation, the current $I_a$ to the three phase coils X, Y and Z is that corresponding to the command signal $V_1$ which corresponds to the output signal 71 of the speed detector 70, and the corresponding force is generated. A capacitor 34 is a compensating capacitor for preventing any oscillation in the first feedback loop. The three pairs of the series-connected circuits of capacitors 58, 60 and 62 and resistors 59, 61 and 63 are connected to the current-input terminals A, B and C and one terminal of the DC voltage source $V_{cc}$ so as to reduce spike voltages during switching periods.

Next, the operations of the second distributor 13 and the second output transistors 8, 9 and 10 are described hereinbelow. The second distributor 13 comprises a voltage drop controller 41 having reference voltage generating means for providing a reference voltage and comparing means for producing an output signal corresponding to the difference between the reference voltage and each of the voltage drops across said first output transistors in each activated period, and a selector 52 (second selector) for selecting a current path from the comparing means to the second output transistors 8, 9 and 10 according to the output signals of the position detector 11.

The current ($i_2 + I_3$) is applied to the resistor 42, and the diodes 43 and 44 when the currents to detecting transistors 45, 46 and 47 are zero, and it produces the reference voltage $$V_{2r} = 1.4 + R_{42} \cdot (i_2 + I_3) \tag{3}$$

On the common terminals (emitters) of the first output transistors 5, 6 and 7, where 1.4 V is the voltage drop across the silicon diodes 43 and 44, and $R_{42}$ is the resistance value of the resistor 42.

The emitters of the detecting transistors 45, 46 and 47 are directly connected to the reference voltage point (or connected through a resistor or a diode), the bases of the detecting transistors 45, 46 and 47 are directly respectively connected to the output terminals of the first output transistors 5, 6 and 7 (or connected through a resistor or a diode).

Figure 3:
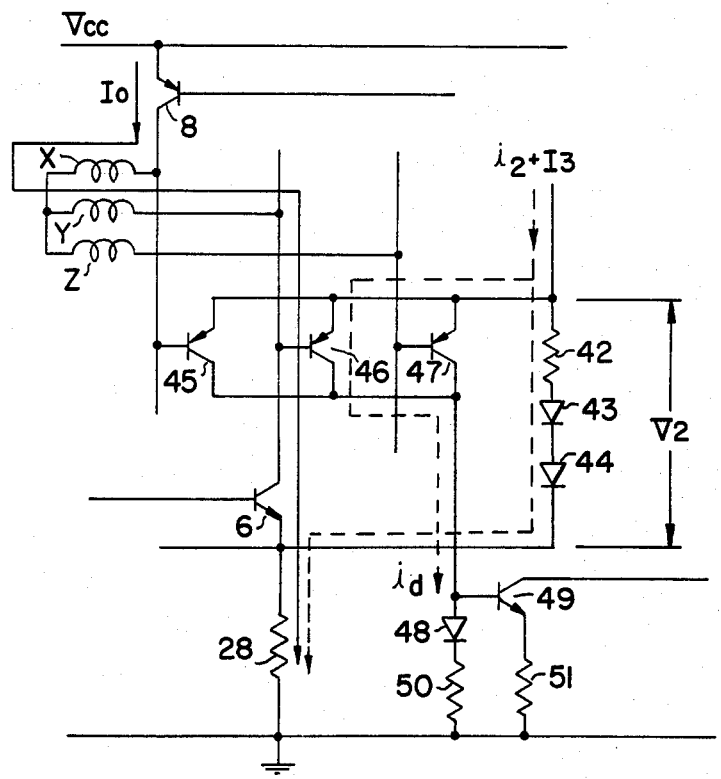
FIG. 3 is a circuit diagram for explaining the operation of the embodiment of FIG. 1.

FIG. 3 shows a current path of $I_a$ when the first output transistor 6 and the second output transistor 8 are activated, and the current path is from the positive terminal of the DC voltage source $V_{cc}$ to the second output transistor 8 to the coils X and Y to the first output transistor 6 to the resistor 28 and then to the negative terminal of the DC voltage source. The voltage drop across the activated first output transistor 6 (i.e. the absolute value of the voltage between collector and emitter, $|V_{CE}|$) is smaller than that across the other first output transistors 5 and 7. Thus, the detecting transistors 45, 46 and 47 compare the voltage drops across the first output transistors 5, 6 and 7 in each activated period with the reference voltage $V_{2r}$, and a detected current $i_d$ is supplied to a current mirror circuit (a diode 48, a transistor 49 and resistors 50, 51) when a voltage drop across a first output transistor in its activated period becomes smaller than $V_{2r} - 0.7$, where 0.7 V is the absolute value of the forward voltage drop between the emitter and base of the corresponding detecting transistor.

In FIg. 3, $i_d$ and $V_2$ are:

$$i_d = (1/R_{42}) \cdot (V_{2r} - 0.7 - |V_{CE}|) \tag{4}$$

$$V_2 = V_{2r} - R_{42} \cdot i_d \tag{5}$$

, when $|V_{CE}|$ is smaller than $V_{2r}-0.7$ (that is, $i_d \geqq 0$). The detected current $i_d$ is supplied to the second selector 52 after being amplified and inverted in its polarity by the current mirror (the diode 48, the transistor 49 and the resistors 50, 51). The second selector 52 comprises transistors 53, 54 and 55 which operate differentially by having their emitters directly connected together (or connected together through a resistor or a diode). As each output voltage of the Hall elements 24, 25 and 26 in the position detector 11 is applied to each base of the transistors 53, 54 and 55 in the second selector 52, the common emitter current, which is the output current of the voltage drop controller 41, is delivered to the collector currents of the transistors 53, 54 and 55 according to the voltage differences among the output voltages of the Hall elements 24, 25 and 26. As the result of this, the transistor having the largest base voltage also has the largest collector current, and the collector currents of the rest of the transistors are much smaller (almost zero).

The activated transistor in the second selector 52 changes smoothly according to the rotation of the magnet 1, because the output voltages of the Hall elements 24, 25 and 26 change smoothly in the fashion of three phase sine waveforms.

Since the collector current of the transistors 53, 54 and 55 in the second selector 52 becomes the respective base current of the second output transistors 8, 9 and 10, the current amplified by each of the second output transistors 8, 9 and 10 is supplied to the three phase coils X, Y and Z. Therefore, the voltage drop controller 41, the second selector 52 and the second output transistors 8, 9 and 10 form another feedback loop (second feedback loop), which controls the voltage drops across the first output transistors 5, 6 and 7 in each activated period to maintain them at a predetermined value in the active operation mode so that the output current of the activated second output transistor is equal to the output current of the activated first output transistor. As the result of the second feedback loop, the operation of the second selector 52 and the second output transistors 8, 9 and 10 for selecting and changing a current path of $I_a$ corresponding to the output signals of the position detector 11 can be firm and smooth so as to keep the selectively and time sequentially flowing current constant, and to avoid current flow through unselected coils and also to switch current flow through the coils precisely. A capacitor 56 is a compensating capacitor for preventing any oscillation in the second feedback loop.

Next, the operations of the two feedback loops (the first and the second feedback loops) will be described below, referring to FIGS. 4(a) and 4(b).

Figure 4:
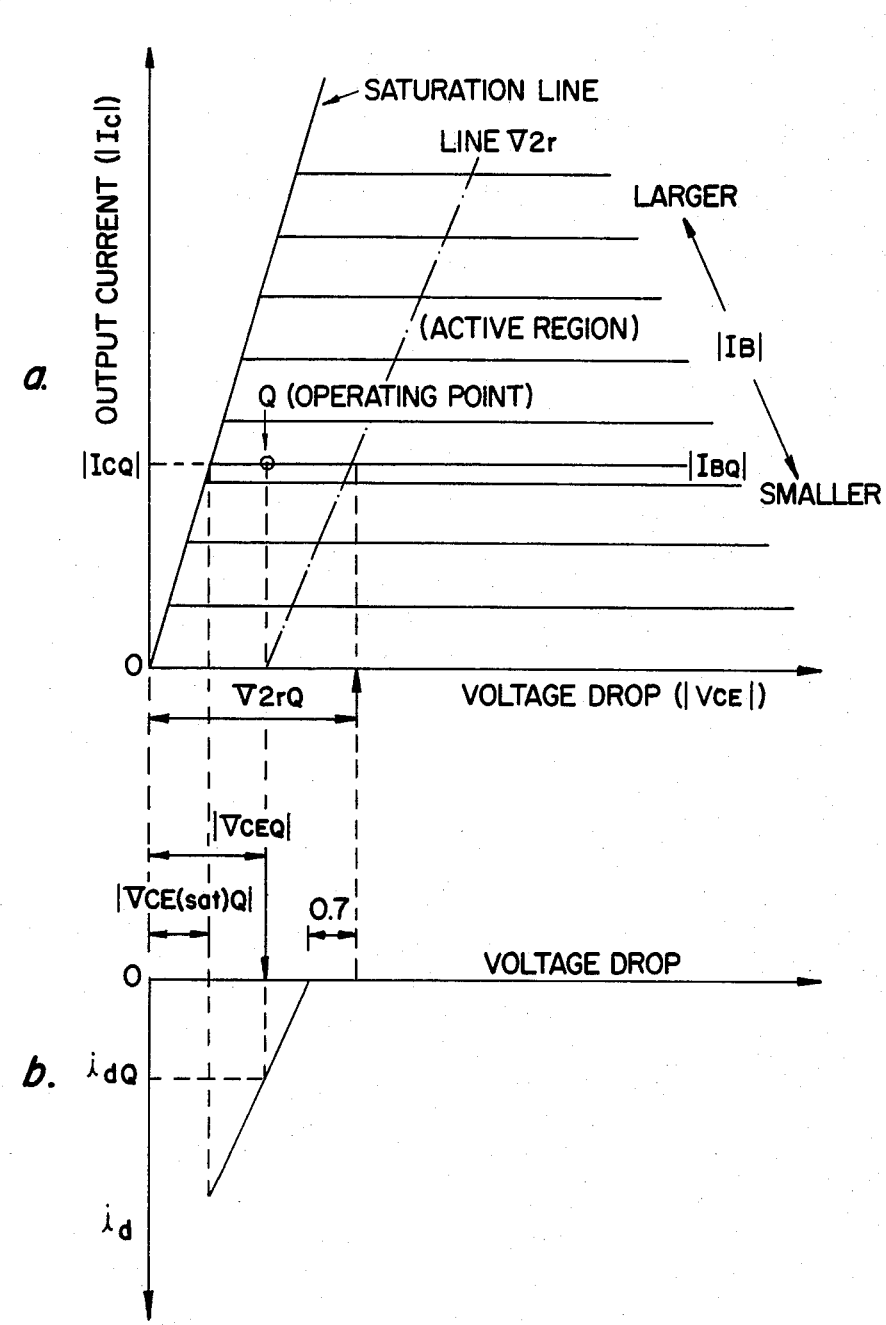
FIGS. 4(a) and 4(b) are graphs for explaining the operation of the embodiment of FIG. 1.

FIG. 4(a) shows the characteristic of voltage drop ($|V_{CE}|$) v.s. output current ($|I_C|$) of a bipolar transistor with a parameter of the base current $|I_B|$ shown by solid lines, where the output current $|I_C|$ of the transistor is shown to be dependent only on the base current $|I_B|$, but is not influenced by the voltage drop $|V_{CE}|$ in active region. (Actually, $|I_C|$ will change according to $|V_{CE}|$ variation, but the amount of the change of $|I_C|$ is so small that it is negligible and may be neglected.) FIG. 4(b) shows the characteristic of voltage drop ($|V_{CE}|$) v.s. detected current id of the detecting transistor, which follows the equation (4). Since both of the command signal $V_1$ and the reference voltage $V_{2r}$ change according to the output current $i_1$ of the voltage-to-current converter 73, the reference voltage $V_{2r}$ changes the value according to the output current $|I_C|$ of the activated first output transistor which is corresponding to the command signal $V_1$ by the operation of the first feedback loop. Thus, the characteristic of $V_{2r}$ v.s. $|I_C|$ is on the dotted line $V_{2r}$ in FIG. 4(a) when the first feedback loop operates normally.

Briefly in the foregoing explanation, the command signal $V_{1Q}$, the reference voltage $V_{2rQ}$, the output current $|I_{CQ}|$ and the base current $|I_{BQ}|$ are dependent on the output current $i_1$ of the voltage-to-current converter 73, where the subscript Q indicates an operating point of the variables $V_1$, $V_{2r}$, $I_C$, $I_B$, etc..

At an equilibrium state of the two feedback loops, the voltage drop $|V_{CEQ}|$ across the activated first output transistor is so determined that the detected current $id_Q$ is just the value needed to keep the output current of the activated second output transistor equal to the output current $|I_{CQ}|$ of the activated first output transistor.

From this state, the output signal 71 of the speed detector 70 is assumed to decrease step by step. The output current $i_1$ of the voltage-to-current converter 73 increases, and the command signal $V_1$ and the reference voltage $V_{2r}$ increase. The output current $|I_C|$ of the activated first output transistor which is selected by the first selector 30 increases corresponding to the increase of the command signal $V_1$ by the operation of the first feedback loop, and this decreases the voltage drop $|V_{CE}|$ across the activated first output transistor. The decrease of the voltage drop $|V_{CE}|$ and the increase of the reference voltage $V_{2r}$ increase the detected current id of the detecting transistor, which causes the increase of the output current of the activated second output transistor selected by the second selector 52.

Finally, the voltage drop $|V_{CE}|$ across the activated first output transistor is maintained at a predetermined value between $|V_{CE(sat)}|$ and $(V_{2r}-0.7)$ in its active region so that the detected current id of the detecting transistor becomes equal to just the value needed to keep the output current of the activated second output transistor equal to the increased output current of the activated first output transistor due to the operation of the second feedback loop. In the above-said explanation, the first and the second feedback loops are assumed to operate independently. But, the two feedback loops actually operate at the same time.

As the result of the two feedback loop operations, the current to the three phase coils X, Y and Z is controlled precisely corresponding to the command signal $V_1$. Thus, the rotational speed of the magnet 1 can be controlled excellently to the desired rotational speed.

In the embodiment of FIG. 1, the voltage drop controller 41 uses only transistors, diodes and resistors, and accordingly, the embodiment can be integrated on a single silicon chip by using integrated circuit (IC) technology. Thus, the drive circuit for the brushless DC motor shown in FIG. 1 is particularly suitable for fabrication as a one chip integrated circuit. Furthermore, since all of the detecting transistor 45, 46 and 47 are PNP type bipolar transistors, the breakdown voltage between base and emitter and the breakdown voltage between base and collector of a lateral PNP transistor (or a substrate PNP transistor) are large enough to avoid any voltage breakdown as a result of spike voltages of the coils X, Y and Z during switching periods.

Since the reference voltage $V_{2r}$ in the voltage drop controller 41 increases according to the increase of the output current $|I_C|$ of the activated first output transistor (see the line $V_{2r}$ in FIG. 4(a)), the voltage drop across the activated first output transistor increases so that the operating point Q ($V_{CEQ}$, $I_{CQ}$) of the first output transistor is maintained in its active region. This $V_{2r}$ shift is important when the characteristic of the saturation line of the transistor is considered. Referring to the saturation line in FIG. 4(a), the saturation voltage $|V_{CE(sat)}|$ of the transistor increases according to the increase of the output current $|I_C|$. Considering that $V_{2r}$ is constant, the margin voltage ($V_{2r} - 0.7 - |V_{CE(sat)}|$) by which the first output transistor is active decreases according to the increase of the output current $|I_C|$, and the detected current id can not be large enough to drive the second output transistor when the output current of the first output transistor becomes large.

Figure 5:
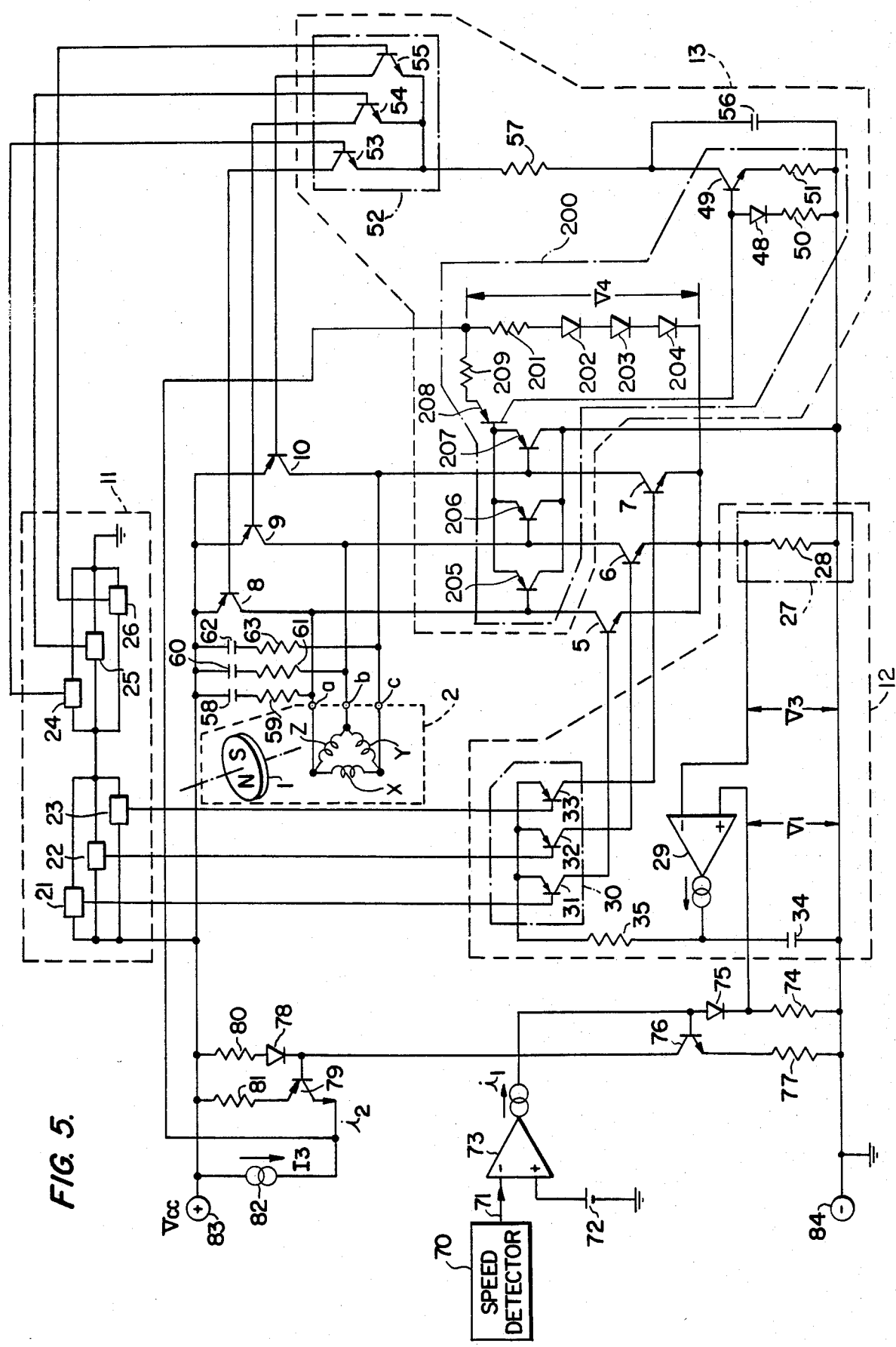
FIG. 5 is a circuit diagram of another embodiment of a brushless DC motor according to the present invention.

FIG. 5 shows another embodiment of the brushless DC motor according to the invention. The construction of this embodiment is the same as that of the embodiment of FIG. 1 except coils x, y and z and a voltage drop controller 200. The other parts of the embodiment in FIG. 5 are the same as those in FIG. 1, so the reference numerals are the same.

In FIG. 5, the delta-connected three phase coils x, y and z are supplied with a current by the first output transistors 5, 6 and 7 and the second output transistors 8, 9 and 10. That is, each of the current-input terminals of the three phase coils x, y and z is connected to a corresponding one of the output terminals of the first output transistors 5, 6 and 7, and is also connected to a corresponding one of the output terminals of the second output transistors 8, 9 and 10. The voltage drop controller 200 comprises: a reference voltage generating means having a resistor 201 and diodes 202, 203, 204 for generating a reference voltage $V_{4r} = 2.1 + R_{201} \cdot (i_2 + I_3)$; a comparing means having detecting transistors 205, 206, 207, a comparing transistor 208 and a resistor 209 for producing an output current corresponding to the difference between the reference voltage $V_{4r}$ and each of the voltage drops across the first output transistors 5, 6 and 7 in each activated period; and a current mirror circuit having the diode 48, the transistor 49 and the resistors 50, 51 (the current mirror can be included in the comparing means). The bases of the detecting transistors 205, 206 and 207 are directly connected to the output terminals of the first output transistors 5, 6 and 7 (or connected through a resistor or a diode), the emitters of the detecting transistors 205, 206 and 207 are directly connected together (or connected together through a resistor or a diode), and the collectors of the detecting transistors 205, 206 and 207 are connected to one terminal (negative terminal 84) of the DC voltage source $V_{cc}$. The base of the comparing transistor 208 is connected to the emitters of the detecting transistors 205, 206 and 207, and the emitter of the comparing transistor 208 is connected to the reference point of the reference voltage generating means through the resistor 209 (or connected directly thereto). Thus, the detecting transistors 205, 206 and 207 detect the voltage drops across the first output transistors 5, 6 and 7 in each activated period, and the comparing transistor 208 compares the detected voltage of the detecting transistors 205, 206 and 207 with the reference voltage $V_{4r}$, and the collector current of the comparing transistor 208 changes corresponding to the difference between the voltage drop across the activated first output transistor and the reference voltage $V_{4r}$.

The operation of this embodiment is same or similar to the operation of the embodiment of FIG. 1 described above, and thus, a detailed explanation thereof has been omitted.

In the embodiment shown in FIG. 1 and FIG. 5, the reference voltage $V_{2r}$ or $V_{4r}$ of the voltage drop controllers 41 and 200 can be generated from the negative terminal 84 of the DC voltage source $V_{cc}$ by connecting the cathode of the diode 44 or 204 to the negative terminal 84 instead of the common terminals of the first output transistors 5, 6 and 7. In such a case, the value of the resistor 42 or 201 should be larger than that in the above embodiment of FIG. 1 or FIG. 5, so as to compensate for the voltage drop $V_3 = R_{28} \cdot I_a$ across the current detector 27 and to properly detect the voltage drop across the activated first output transistors.

Figure 6:
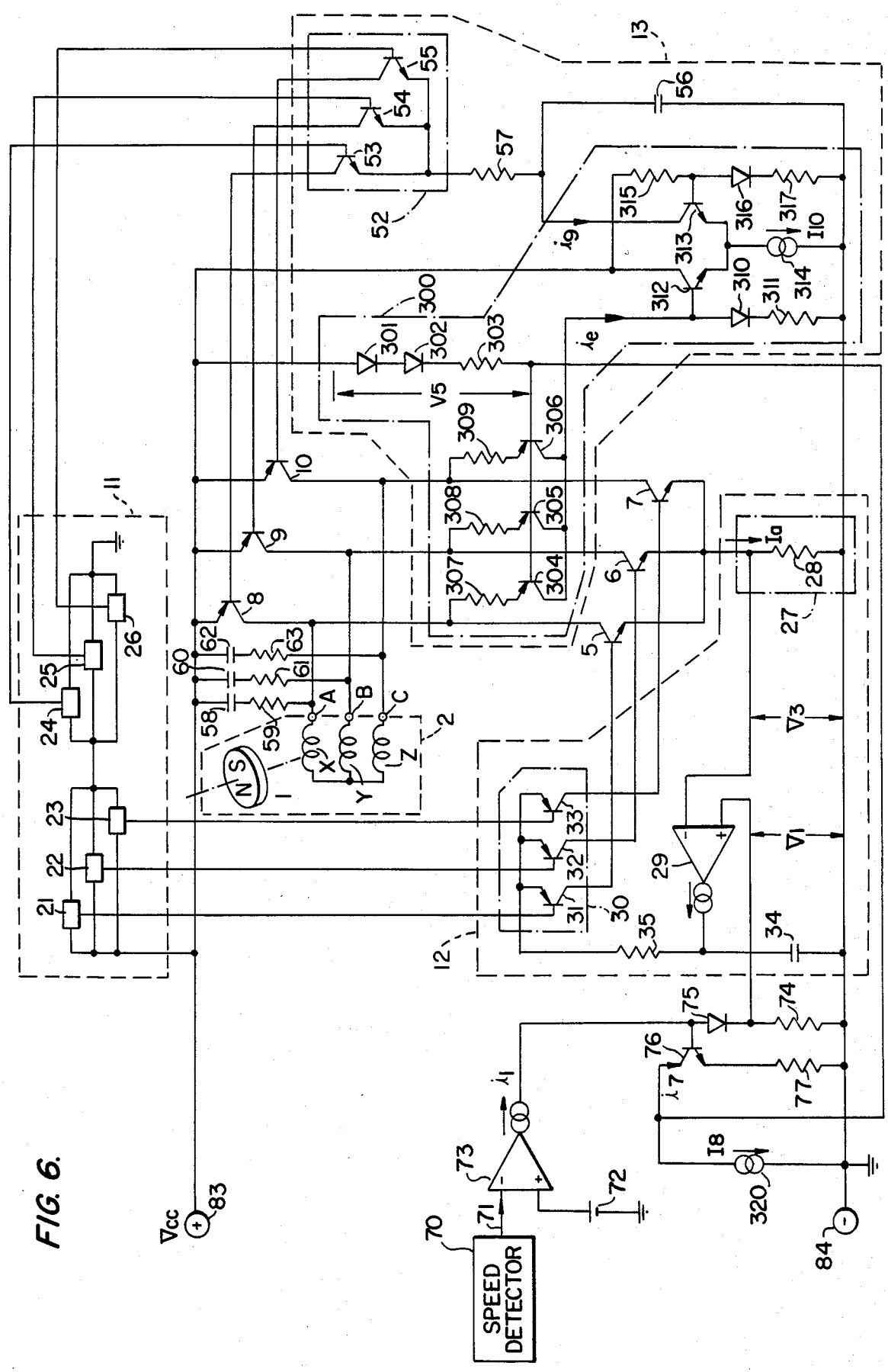
FIG. 6 is a circuit diagram of still another embodiment of a brushless DC motor according to the present invention.

FIG. 6 shows another embodiment of a brushless DC motor according to the invention. The construction of this embodiment is the same as that of the embodiment shown in FIG. 1 except a voltage drop controller 300, a constant current source 320 and the current mirror (the resistors 74, 77, the diode 75 and the transistor 76). The other parts of the embodiment in FIG. 6 are the same as those in FIG. 1, so that the reference numerals are the same.

The output current $i_7$ of the current mirror is similar to the current $i_1$ of the voltage-to-current converter 73. The current $i_7$ and the current $I_8$ of the constant current source 320 are combined, and the combined current ($i_7 + I_8$) is supplied to the voltage drop controller 300. The voltage drop controller 300 comprises: a reference voltage generating means having diodes 301, 302 and a resistor 303 for providing a reference voltage; a comparing means having detecting transistors 304, 305, 306 and resistors 307, 308, 309 for producing an output current corresponding to the difference between the reference voltage and each of the voltage drops across the second output transistors in each activated period; and a comparator having transistors 312, 313, diodes 310, 316 and resistors 311, 315, 317 for producing an output current to the second selector 52 corresponding to the output current of the comparing means (the comparator can be included in the comparing means).

The current ($i_7 + I_8$) is supplied to the diodes 301, 302 and the resistor 303 when the base currents of the detecting transistors 304, 305 and 306 are zero, and the current ($i_7$ to $I_8$) produces the reference voltage:

$$V_{5r} = 1.4 + R_{303} \cdot (i_7 + I_8) \tag{6}$$

from the common terminals (emitters) of the second output transistors 8, 9 and 10, where 1.4 V is the voltage drop across the silicon diodes 301 and 302, and $R_{303}$ is the resistance value of the resistor 303. The bases of the detecting transistors 304, 305 and 306 are directly connected to the reference voltage point, and the emitters of the detecting transistors 304, 305 and 306 are respectively connected to the output terminals of the second output transistors 8, 9 and 10 through the resistors 307, 308 and 309.

Figure 8:
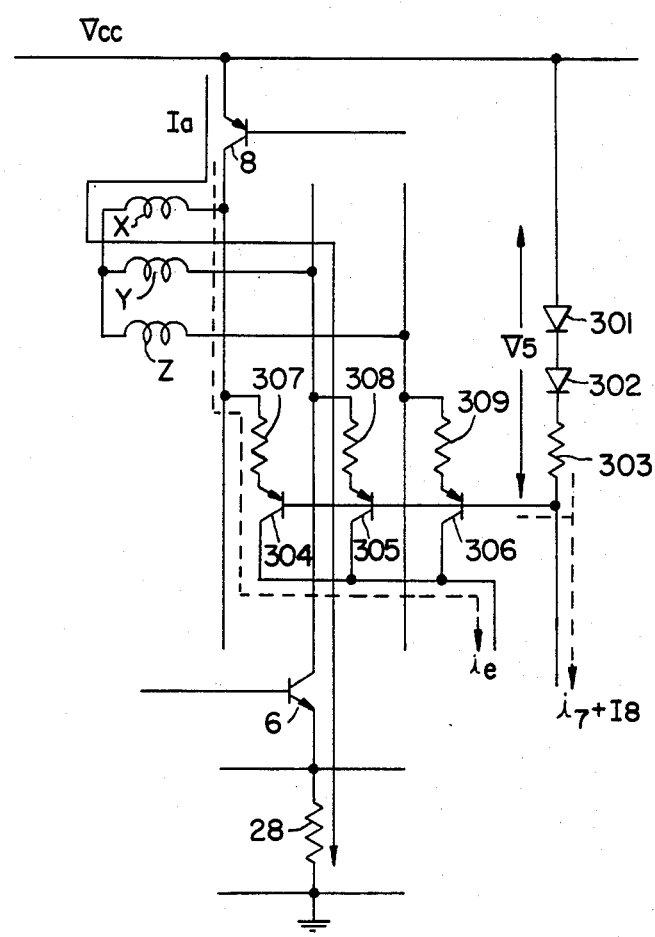
FIG. 8 is a circuit diagram for explaining the operation of the embodiment of FIG. 6.

FIG. 8 shows a current path of the current $I_a$ supplied to the three phase coils X, Y and Z when the first output transistor 6 and the second output transistor 8 are activated, and the current path is from the positive terminal of the DC voltage source $V_{cc}$ to the second output transistor 8 to coils X and Y to the first output transistor 6 to the resistor 28 to the negative terminal of the DC voltage source $V_{cc}$. The voltage drop across the activated second output transistor 8 (i.e.—the absolute value of the voltage because its emitter and collector, $V_{CE}$) is smaller than that of the other second output transistors 9 and 10. Thus, the detecting transistors 304, 305 and 306 compare the voltage drops across the second output transistors 8, 9 and 10 in each activated period with the reference voltage $V_{5r}$, and the detected current $i_e$ is supplied to the comparator (the diodes 310, 316, the transistors 312, 313 and the resistors 311, 315, 317) when a voltage drop across a second output transistor in its activated period becomes smaller than $V_{5r}-0.7$, where 0.7 V is the absolute value of the forward voltage drop between emitter and base of the corresponding detecting transistor. In FIG. 8, neglecting the base current of the activated detecting transistor 304, $i_e$ and $V_5$ are:

$$i_e = (1/R_{307}) \cdot (V_5 - 0.7 - |V_{CE}|) \quad (7)$$

$$V_5 = V_{5r} \quad (8)$$

, when $|V_{CE}|$ is smaller than $V_{5r}-0.7$ (that is, $i_e \geq 0$). The detected current $i_e$ is supplied to the diode 310 and the resistor 311, and produces a voltage which is supplied to the base of the transistor 312. The transistors 312 and 313 form a differential circuit which compares the voltage produced by $i_e$ with a divided voltage equal to $V_{cc}$ divided by the resistors 315, 317 and the diode 316. Since the collector current $i_9$ of the transistor 313 is the output current of the voltage drop controller 300, $i_9$ increases according to the increase of the voltage drop across the activated second output transistor, $i_9$ becomes a maximum (the current $I_{10}$ of the constant current source 314) when the voltage drop across the activated second output transistor becomes larger than $V_{5r}-0.7$, and $i_9$ is equal to zero or is a very small value when the activated second output transistor saturates.

The motor structure 2 (the magnet 1 and the three phase coils X, Y and Z), the position detector 11 (the Hall elements 21, 22, 23, 24, 25 and 26), the first distributor 12 (the current detector 27, the current controller 29 and the first selector 30), the second selector 52 in the second distributor 13, the speed detector 70 and the voltage-to-current converter 73 are the same as those in FIG. 1. Thus, the current detector 27, the current controller 29, the first selector 30 and the first output transistors 5, 6 and 7 form the first feedback loop which controls the current $I_a$ to the three phase coils X, Y and Z according to the command signal $V_1$ so that it is constant irrespective of an unbalance and a variation of the $h_{FE}$ values of the first output transistors 5, 6 and 7. The voltage drop controller 300, the second selector 52 and the second output transistors 8, 9 and 10 form another feedback loop (second feedback loop in FIg. 6), which controls the voltage drops across the second output transistors 8, 9 and 10 in each activated period to maintain them at a predetermined value in active operation mode so that the output current of the activated second output transistor is equal to the output current of the activated first output transistor.

The operations of the two feedback loops (the first and the second feedback loops) in FIG. 6 will be described below, referring to FIGS. 9(a), 9(b) and 9(c).

Figure 9:
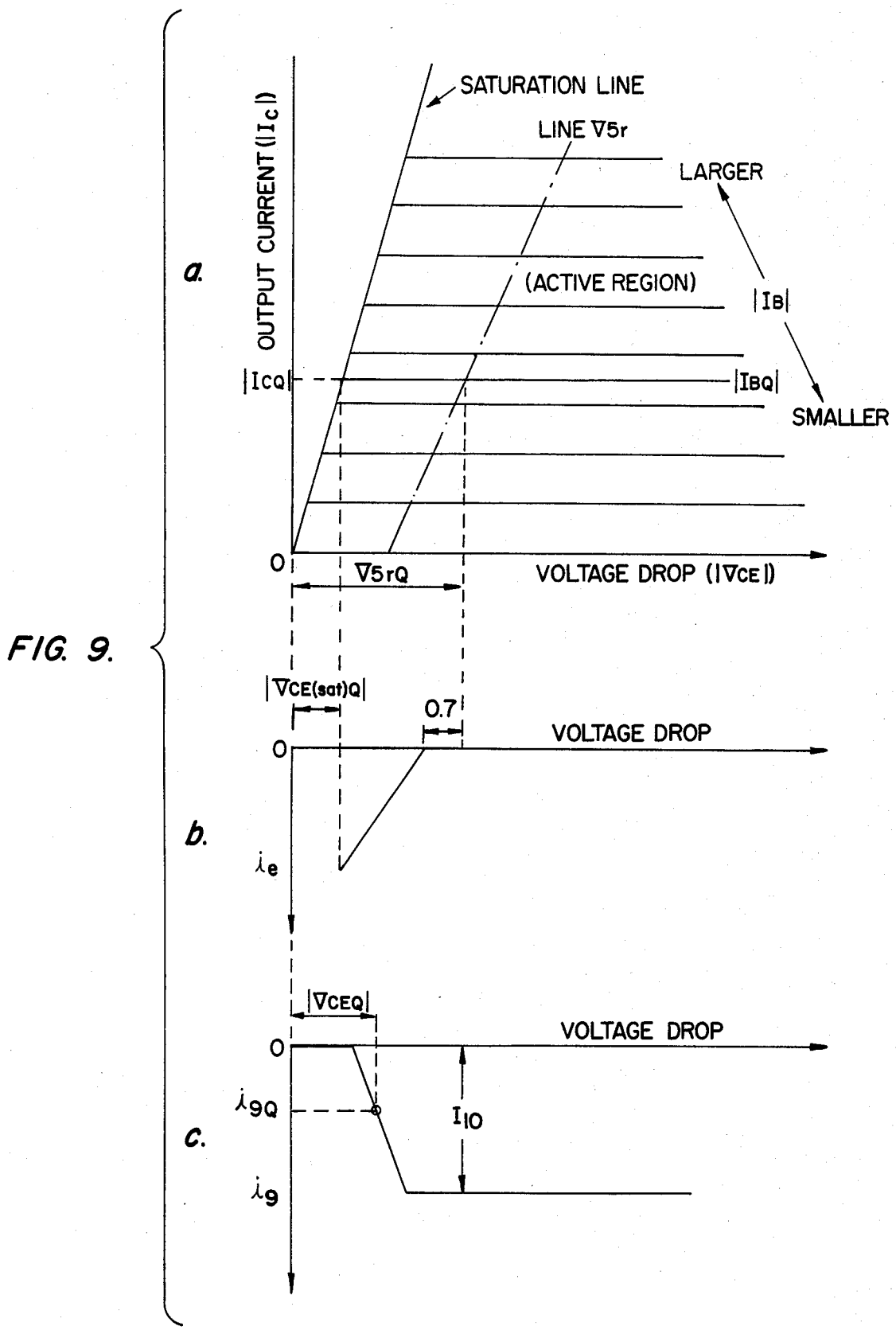
FIGS. 9(a), 9(b) and 9(c) are graphs for explaining the operation of the embodiment of FIG. 6.

FIG. 9(a) shows the characteristic of voltage drop ($|V_{CE}|$) v.s. output current ($|I_C|$) of a bipolar transistor with a parameter of the base current $|I_B|$ shown by solid lines. FIG. 9(b) shows the characteristic of voltage drop $|V_{CE}|$ v.s. detected current $i_e$ of the detecting transistor, which follows the equation (7). FIG. 9(c) shows the characteristic of voltage drop $|V_{CE}|$ v.s. output current $i_9$ of the voltage drop controller 300.

At an equilibrium state of the two feedback loops, the voltage drop $|V_{CEQ}|$ across the activated second output transistor is determined so that the output current $i_{9Q}$ of the voltage drop controller 300 is just the value needed to keep the output current of the activated second output transistor equal to the output current of the activated first output transistor. Thus, the reference voltage $V_{5r}$ relates to the output current $|I_C|$ of the activated second output transistor (see the line $V_{5r}$ in FIG. 9(a)).

From this state, the output signal 71 of the speed detector 70 is assumed to decrease step by step. The output current $i_1$ of the voltage-to-current converter 73 increases, and the command signal $V_1$ and the reference voltage $V_{5r}$ increase. The output current of the activated first output transistor selected by the first selector 30 increases corresponding to an increase of the command signal $V_1$ due to the operation of the first feedback loop. This decreases the voltage drop across the activated first output transistor and increases the voltage drop across the activated second output transistor as well as the voltage drop across the coils. The increase of the voltage drop $|V_{CE}|$ across the activated second output transistor is greater than the increase of the reference voltage $V_{5r}$, because the voltage drop $|V_{CE}|$ across the activated second output transistor increases whenever the output current of the activated second output transistor is smaller than the output current of the activated first output transistor. Therefore, the detected current $i_e$ of the detecting transistor decreases, and the output current $i_9$ of the voltage drop controller 300 increases. This causes the increase of the output current of the activated second output transistor selected by the second selector 52.

Finally, the voltage drop $|V_{CE}|$ across the activated second output transistor is maintained at a predetermined value between $|V_{CE(sat)}|$ and $(V_{5r}-0.7)$ in its active region so that the output current $i_9$ of the voltage drop controller 300 becomes equal to just the value needed to keep the output current of the activated second output transistor equal to the increased output current of the activated first output transistor due to the operation of the second feedback loop.

In the explanation noted above the first and the second feedback loops are assumed to operate independently. But, the two feedback loops actually operate at the same time.

In the embodiment of FIG. 6, the voltage drop controller 300 uses only transistors, diodes and resistors, and accordingly, this embodiment can be integrated on a silicon chip by the use of integrated circuit (IC) technology. The drive circuit for the brushless DC motor shown in FIG. 6 is also particularly suitable for a one chip integrated circuit. Furthermore, since all of the detecting transistor 304, 305 and 306 are PNP type bipolar transistors, the breakdown voltage between emitter and base and the breakdown voltage between emitter and collector of a lateral PNP transistor (or a substrate PNP transistor) are large enough to avoid any voltage breakdown as a result of spike voltages of the coils X, Y and Z occurring during switching periods.

Since the reference voltage $V_{5r}$ in the voltage controller 300 increases according to the increase of the output current $|I_C|$ of the activated second output transistor (see the line $V_{5r}$ in FIG. 6), the voltage drop across the activated second output transistor increases so that the operating point Q ($V_{CEQ}$, $I_{CQ}$) of the second output transistor is maintained in its active region. This $V_{5r}$ shift is important when the characteristic of the saturation line of the transistor is considered. Referring to the saturation line in FIG. 9(a), the saturation voltage $|V_{CE(sat)}|$ of the transistor increases according to the increase of the output current $|I_C|$. Considering that $V_{5r}$ is constant, the margin voltage ($V_{5r}-0.7-|V_{CE(sat)}|$) by which the second output transistor is active decreases according to the increase of the output current $|I_C|$, and the output current $i_9$ of the voltage drop controller 300 can not be large enough to drive the second output transistor when the output current of the first output transistor becomes large.

Figure 7:
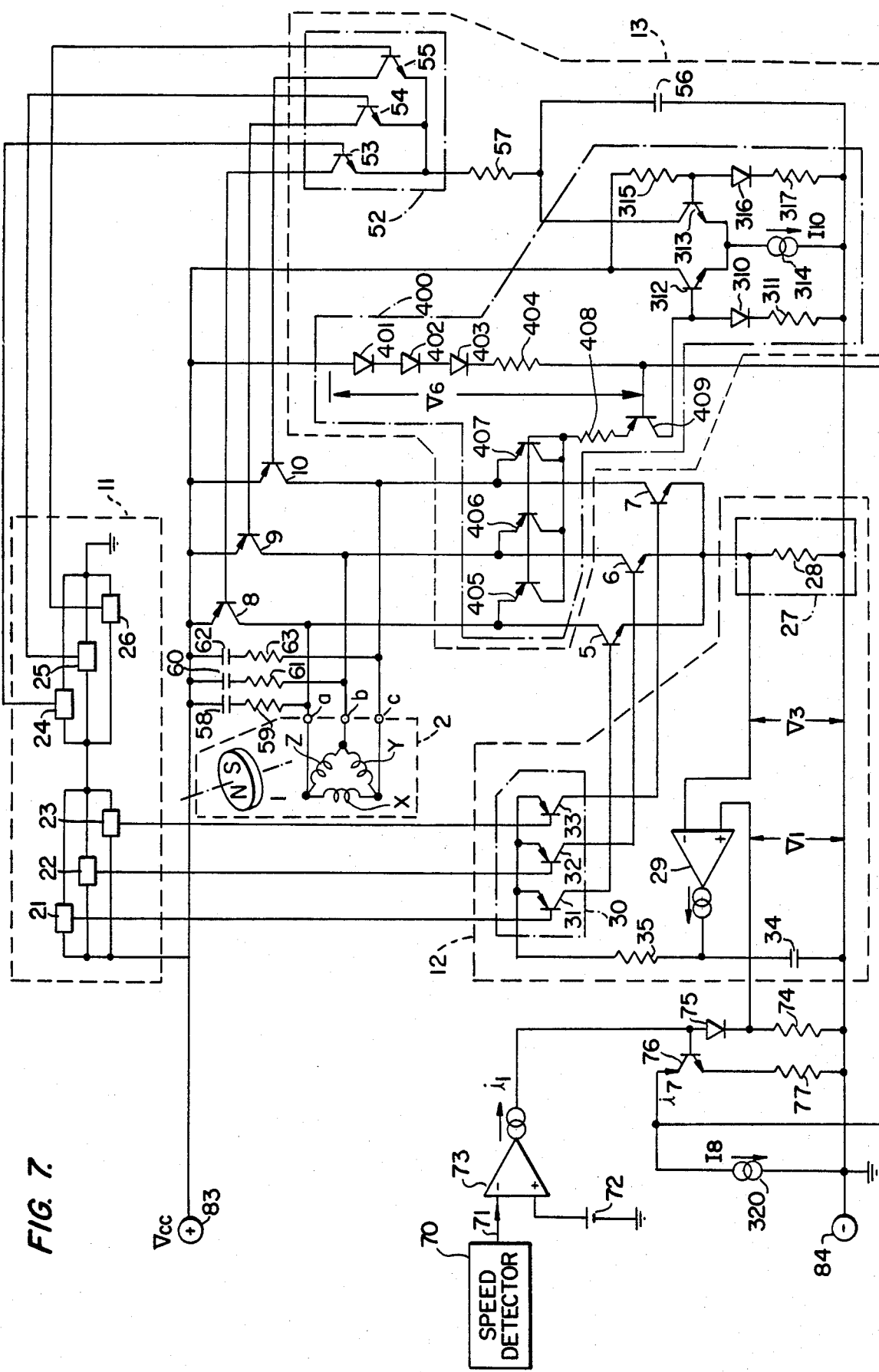
FIG. 7 is a circuit diagram of a further embodiment of a brushless DC motor according to the present invention.

FIG. 7 shows another embodiment of the brushless DC motor according to the invention. The construction of this embodiment is the same as that of the embodiment of FIG. 6 except for the coils x, y and z and a voltage drop controller 400. The other parts of the embodiment in FIG. 7 are the same as those in FIG. 6, and accordingly, the reference numerals are the same.

In FIG. 7, the delta-connected three phase coils x, y and z are supplied with a current by the first output transistors 5, 6 and 7 and the second output transistors 8, 9 and 10. That is, each of the current input terminals of the three phase coils x, y and z is connected to a corresponding one of the output terminals of the first output transistors 5, 6 and 7, and is also connected to a corresponding one of the output terminals of the second output transistors 8, 9 and 10. The voltage drop controller 400 comprises: a reference voltage generating means having diodes 401, 402, 403 and a resistor 404 for generating a reference voltage $V_{6r}=2.1+R_{404}\cdot(i_7+I_8)$; a comparing means having detecting transistors 405, 406, 407, a comparing transistor 409 and a resistor 408 for producing an output current corresponding to the difference between the reference voltage $V_{5r}$ and each of the voltage drops across the second output transistors 8, 9 and 10 in each activated period; and a comparator having the diodes 310, 316, the transistors 312, 313, the resistors 311, 315, 317 and the current source 314 (the comparator can be included in the comparing means). The detecting transistors 405, 406 and 407 are all diode-connected. The emitters of the detecting transistors 405, 406 and 407 are directly respectively connected to the output terminals of the second output transistors 8, 9 and 10, and the bases (and collectors) of the detecting transistors 405, 406 and 407 are connected together. The emitter of the comparing transistor 409 is connected to the bases of the detecting transistors 405, 406 and 407 through the resistor 408, and the base of the comparing transistor 409 is point connected to the reference voltage $V_{6r}$ point. The detecting transistors 405, 406 and 407 detect the voltage drops across the second output transistors 8, 9 and 10 in each activated period, and the comparing transistor 409 compares the detected voltage of the detecting transistors 405, 406 and 407 with the reference voltage $V_{6r}$, and the collector current of the comparing transistor 409 changes corresponding to the difference between the voltage drop across the activated second output transistor and the reference voltage $V_{6r}$. The operation of this embodiment is the same or similar to the operation of the embodiment of FIG. 6 described before, and thus, the explanation thereof has been abbreviated.

In the foregoing embodiments, bipolar transistors are used for the first and the second output transistors 5, 6, 7, 8, 9 and 10. However, field effect transistors may also be used for the first and the second transistors, because the characteristic of $V_{DS}$ v.s. $I_D$ ($V_{DS}$: drain-source voltage, $I_D$: drain current) of a field effect transistor is similar to the characteristic of $V_{CE}$ v.s. $I_C$ of a bipolar transistor.

As is well-known in the art, the output current $I_D$ is controlled by the gate voltage. Thus, the drain, source and gate of the field effect transistor respectively correspond to the output, input and control terminals of the output transistor.

Although the description of the above embodiments is directed to a brushless DC motor having three phase coils, it should be understood that this invention is applicable to a brushless DC motor having any number of phase coils. In addition, this invention is applicable not only to a rotational type brushless DC motor but also to a linear type brushless DC motor.

What is claimed is:

1. A brushless DC motor comprising:
   a field flux generating means having a plurality of N and S poles;
   multiphase coils for generating a force by the interaction between a current flowing through said multiphase coils and fluxes of said field flux generating means;
   a DC voltage sourcr for supplying a current to said multiphase coils;
   a plurality of first output transistors;
   a plurality of second output transistors, each of the current-input terminals of said multiphase coils being connected to a corresponding one of said plurality of first output transistors and to a corresponding one of said plurality of second output transistors so as to supply said multiphase coils with a current by activating at least one of said first output transistors and at least one of said second output transistors at the same time;
   a position detecting means for providing a set of output signals corresponding to the relative position between said filed flux generating means and said multiphase coils;
   a first distributing means for selectively activating said plurality of first output transistors corresponding to the output signals of said position detecting means so as to supply said multiphase coils with a current according to a command signal; and
   a second distributing means for selectively activating said plurality of second output transistors corresponding to the output signals of said position detecting means,
   wherein said second distributing means has a voltage drop controlling means for detecting voltage drops across said first output transistors in each activated period and for controlling output currents of said second output transistors so as to maintain the voltage drops across said first output transistors in each activated period at a predetermined value.

2. A brushless DC motor as claimed in claim 1, wherein said voltage drop controlling means has a reference voltage generating means for providing a reference voltage so as to produce a signal output corresponding to the difference between said reference voltage and each of the voltage drops across said first output transistors in each activated period, and wherein said reference voltage changes in correspondence with the current supplied to said multiphase coils.

3. A brushless DC motor as claimed in claim 1, wherein said voltage drop controlling means has a plurality of detecting transistors, one terminal of each of said detecting transistors being connected to a corresponding one of the output terminals of said first output transistors, and wherein said detecting transistors are PNP type bipolar transistors.

4. A brushless DC motor as claimed in claim 1, wherein said second distributing means having said voltage drop controlling means has a reference voltage generating means for providing a reference voltage and comparing means for producing an output corresponding to the difference between said reference voltage and a each of the voltage drops across said first output transistors in each activated period, and selecting means for selecting a current path from said comparing means to said second output transistors according to the output signals of said position detecting means.

5. A brushless DC motor as claimed in claim 1, wherein said first distributing means includes a current detecting means for detecting the total current to said multiphase coils so as to supply said multiphase coils with a current according to said command signal irrespective of the relative position between said field flux generating means and said multiphase coils.

6. A brushless DC motor as claimed in claim 1, wherein said first distributing means has a current detecting means for detecting the total current to said multiphase coils, a current controlling means for providing a signal output corresponding to the difference between the output signal of said current detecting means and said command signal, and a selecting means for selecting a current path from said current controlling means to said first output transistors according to the output signals of said position detecting means.

7. A brushless DC motor comprising:
a field flux generating means having a plurality of N and S poles;
multiphase coils for generating a force by the interaction between a current flowing through said multiphase coils and fluxes of said field flux generating means;
a DC voltage source for supplying a current to said multiphase coils;
a plurality of first output transistors;
a plurality of second output transistors, each of the current-input terminals of said multiphase coils being connected to a corresponding one of said plurality of first output transistors and to a corresponding one of said plurality of second output transistors so as to supply said multiphase coils with a current by activating at least one of said first output transistors and at least one of said second output transistors at the same time;
a position detecting means for providing a set of output signals corresponding to the relative position between said field flux generating means and said multiphase coils;
a first distributing means for selectively activating said plurality of first output transistors corresponding to the output signals of said position detecting means so as to supply said multiphase coils with a current according to a command signal; and
a second distributing means for selectively activating said plurality of second output transistors corresponding to the output signals of said position detecting means,
wherein said second distributing means has a voltage drop controlling means for detecting voltage drops across said second output transistors in each activated period and for controlling output currents of said second output transistors so as to maintain the voltage drops across said second output transistors in each activated period at a predetermined value.

8. A brushless DC motor as claimed in claim 7, wherein said voltage drop controlling means has a reference voltage generating means for providing a reference voltage so as to produce a signal output corresponding to the difference between said reference voltage and each of the voltage drops across said second output transistors in each activated period, and wherein said reference voltage changes in correspondence with the current supplied to said multiphase coils.

9. A brushless DC motor as claimed in claim 7, wherein said voltage drop controlling means has a plurality of detecting transistors, one terminal of each of said detecting transistors being connected to a corresponding one of the output terminal of said second output transistors, and wherein said detecting transistors are PNP type bipolar transistors.

10. A brushless DC motor as claimed in claim 7, wherein said second distributing means having said voltage drop controlling means has a reference voltage generating means for providing a reference voltage and comparing means for producing a signal output corresponding to the difference between said reference voltage and each of the voltage drops across said second output transistors in each activated period, and a selecting means for selecting a current path for said comparing means to said second output transistors according to the output signals of said position detecting means.

11. A brushless DC motor as claimed in claim 7, wherein said first distributing means includes a current detecting means for detecting the total current to said multiphase coils so as to supply said multiphase coils with a current according to said command signal irrespective of the relative position between said field flux generating means and said multiphase coils.

12. A brushless DC motor as claimed in claim 7, wherein said first distributing means has a current detecting means for detecting the total current to said multiphase coils, a current controlling means for providing a signal output corresponding to the difference between the output signal of said current detecting means and said command signal, and a selecting means for selecting a current path from said current controlling means to said first output transistors according to the output signals of said position detecting means.

* * * * *